July 30, 1929.

A. D. TRENOR 1,722,644

SYNCHRONIZATION OF MOTION PICTURES AND MUSIC

Filed Oct. 20, 1926

INVENTOR.
Albert D. Trenor
BY G. A. E. Lundell
ATTORNEY

July 30, 1929.  A. D. TRENOR  1,722,644
SYNCHRONIZATION OF MOTION PICTURES AND MUSIC
Filed Oct. 20, 1926  4 Sheets-Sheet 3

INVENTOR.
Albert D. Trenor
BY
ATTORNEY.

Patented July 30, 1929.

1,722,644

UNITED STATES PATENT OFFICE.

ALBERT D. TRENOR, OF GLOUCESTER, MASSACHUSETTS, ASSIGNOR TO JOHN HAYS HAMMOND, JR., OF GLOUCESTER, MASSACHUSETTS.

SYNCHRONIZATION OF MOTION PICTURES AND MUSIC.

Application filed October 20, 1926. Serial No. 142,989.

This invention relates to improvements in synchronization of motion pictures and music.

Among the objects of the present invention are the provision of improved means for automatically operating a musical instrument in step with a motion picture projector so as to simulate the appearance and action of actual occurrences; to provide means to modify the action at the will of an operator; to provide an improved shifting mechanism for controlling a player roll sheet; to provide improved means for automatically compensating for variations in speed of roll sheet.

Other objects will appear from the following description taken in connection with the accompanying drawings in which Figures 1, 2 and 3 joined together on lines A—A and B—B show collectively an elevation of a system constructed in accordance with the invention.

Like reference characters refer to like parts in the several figures of the drawings.

In the following description and claims, parts will be identified by specific names for convenience of expression, but they are intended to be as generic in their application to similar parts or equivalent construction as the art will permit.

Referring to Figures 1 to 9 inclusive, there is provided a motion picture projector 10 having a source of light shown diagrammatically as at 11 and controlled by a switch 12 and energized by a power source such as a power main 13. The light source 11 is arranged to emit a beam of light through a lens tube 14 and upon a condensing lens 15. The condensing lens 15 is mounted upon a wall of the motion picture projector 10, and is arranged conventionally to concentrate the light rays upon a motion picture film 16 passing through the projector. The light rays which are passed through the film are focused by a usual lens 17 and through a timed shutter mechanism 18, so as to be intermittently directed to a screen (not shown) upon which the pictures appear successively.

For moving the film through the projector, and for simultaneously actuating the shutter mechanism thereof, there is provided a motor 20 controlled by a switch 21 and energized by a suitable source of energy such as a power main 22. A horizontal rotatable shaft 23 is operatively connected to the motor 20 so as to be driven thereby at a uniform speed. A bevel gear 24 is affixed to the shaft 23 and meshes with a second bevel gear 25 mounted upon a vertical rotatable shaft 26 journalled in spaced bearings 27, 28 affixed to the frame of the projector.

The lower end of the vertical shaft 26 projects through the lower bearing 28 and terminates in a castellated clutch member 30 affixed thereto forming the driving element of a clutch 31, the other element of which comprises a second castellated member 32 forming a driven clutch element. The last named clutch element 32 is slidably mounted on a splined shaft 33 rotatably mounted in a fixed bearing 34 mounted on the outboard end of a bracket 35. The driven clutch element 32 may be connected to the shaft 33 to cause the shaft to rotate with the clutch element by any suitable means as by a key cooperating with splines or grooves in said elements, and is also provided with an annular groove 36 into which there extends a pair of pins 37, 37. The pins 37 are each mounted on a yoke forming one end of a lever arm 38 the other end of which terminates in a convenient handle. The arm 38 is pivoted intermediately as at 39 to an upstanding lug or ear forming part of the bracket 35. Near the handle of the arm 38 and substantially parallel to the path of movement thereof is an arcuate bracket 40 provided with a pair of notches for engaging the arm 38 and serving to maintain the arm in either of two selected positions. The shaft 33 is also provided with a driving disc 41 forming one element of a variable speed friction drive 43.

The automatic player action comprises means for driving a perforated paper note sheet 50 over the openings of a conventional tracker bar 51. The sheet is initially on an upper or unwinding spool 52 and in the operation of the automatic action is wound upon a lower spool 53. The upper spool is removably mounted upon aligned shafts 54 and 55. The lower spool is similarly mounted upon aligned shafts 56 and 57. The shafts are journalled in conventional bearings in the walls of action casing 58.

For variably controlling the speed of the unwinding spool 52 there is provided on the shaft 54 a driven friction element comprising a roller 60 having a grooved periphery on which is mounted a rubber tire arranged to make frictional contact with one face of the driving disc 41. The roller 60 is affixed to a hub 61 which slides on the shaft 54. It will be noted that the shafts 54, 55 are mounted for rotation and longitudinal movement. The hub 61 is provided with a key which slides in a longitudinal groove or spline in the shaft 54. A brake member 62 resiliently engages a transverse face of the roller 60, and is mounted on the free end of a spring arm 63, the other end of which is affixed to the casing 58. The hub 61 is provided with an annular groove 64 into which projects a pin 65 carried on one end of an arm 66. This arm is pivoted as at 67 to the frame of the player mechanism. Thus by movement of the arm 66 about its pivot the roller 60 is caused to engage the disc 41 and to be driven thereby. The lower end of the shaft 33 passes through a second or lower bearing 68 and terminates in a driving pinion gear of a differential mechanism 69 of conventional construction. The differential includes a usual casing 70 to which there is operatively connected a worm wheel 71. A worm gear 72 and a supporting shaft 73 therefor are driven thereby and are rotatably mounted for such rotation in suitable bearings in the framework of the differential. The shaft 73 terminates at one end in a crank handle 74 whereby it may be manually rotated at will. The driven gear element of the differential 69 is operatively connected to a shaft 75 which is mounted in spaced bearings such as 76 affixed to the frame of the structure. Slidably mounted on the shaft 75 is a disc 77 and a hub 78 integral therewith. The hub 78 may be connected to shaft 75 by key 79 engaging grooves in said hub and said shaft. A collar 80 pinned to the shaft serves as an abutment to limit the longitudinal movement of the disc in one direction. The hub 78 is provided with an annular groove 81 into which projects a pin 82 carried on one end of a T arm 83 which is pivoted as at 84 to a fixed portion of the structure. One end 85 is operatively connected as by a usual pin and slot connection to a slidable rod 86 mounted for longitudinal movement in spaced bearings 87 and 88, and held in adjusted position by a spring 89 engaging notches in the rod 86. One end of the rod 86 terminates in a knob 90. A similar pin and slot connection also interconnects the rod 86 and the pivoted arm 66 so that by actuating the knob 90 to move the rod 86 the arms 66 and T arm 83 are rotated about their respective pivots.

Figure 1:
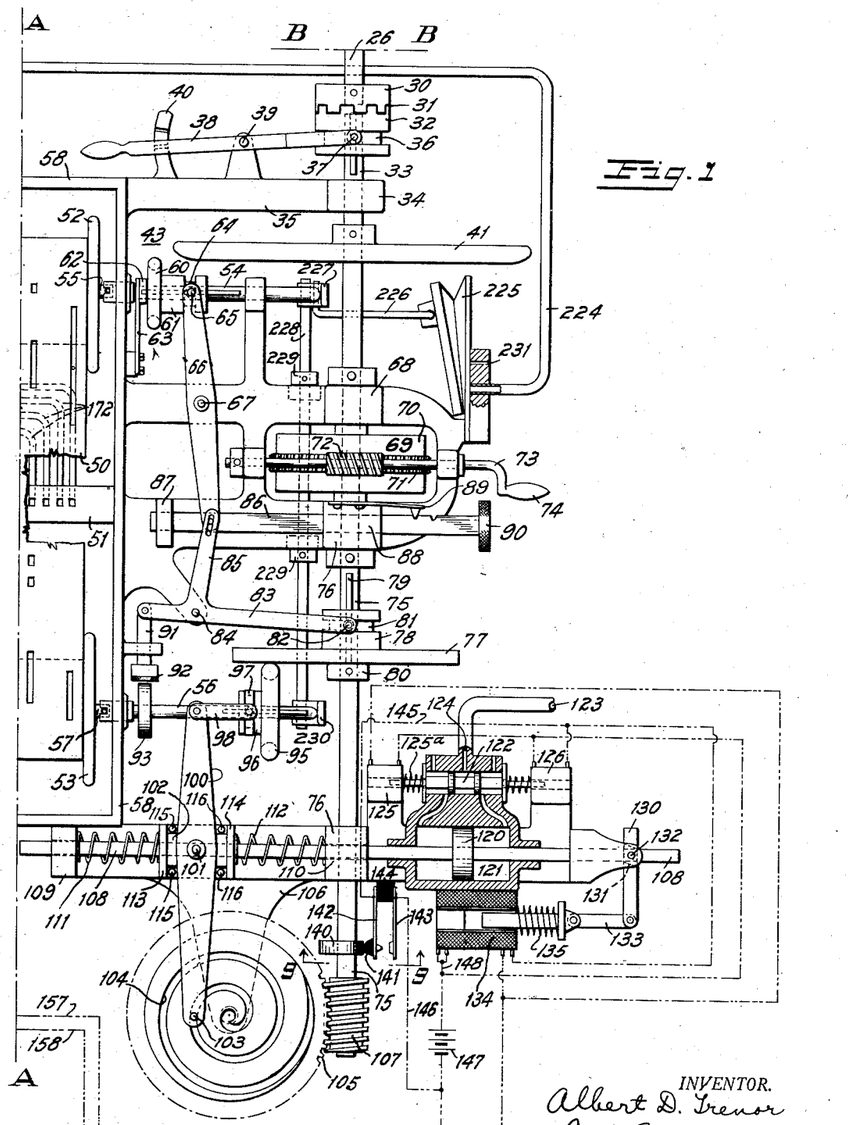

The T arm 83 is operatively connected at its left hand end (as seen in Figure 1) to a brake shoe arm 91 to which is attached a brake shoe 92 arranged to reciprocate, under control of the knob 90, into and out of engagement with the periphery of a wheel 93. The wheel 93 is affixed to the right hand lower spool supporting shaft 56. Thus the lower or wind-up spool 53 may be effectively retarded when the paper 50 is rewound. For driving the shaft 56 a driving roller 95 is slidably mounted thereon, but keyed so as to rotate therewith. The periphery of the drive roller 95 is provided with a rubber tire for frictional engagement with a face of the disc 77. The roller 95 is secured to a hub 96 which has a groove in which is rotatably mounted a collar 97. The collar 97 is pivotally secured to one end of a link 98 the opposite end of which is pivoted to an arm 100. The arm 100 is pivoted at an intermediate point as at 101 to a sliding block 102. The other end of the arm 100 engages by means of a rolling contact 103 a spiral groove 104 in a face of a gear wheel 105. The gear wheel is rotatably mounted on a bracket 106 and its teeth are in mesh with a worm 107 which is secured to the lower end of the shaft 75. The block 102 is mounted on a sliding rod 108 which is journalled in spaced bearings 109, 110. The bearings 109, 110 are affixed to the frame of the structure.

For normally maintaining the rod 108 and its block 102 in mid position there is provided a pair of compression springs 111, 112. These springs are mounted on the rod 108 and the left hand spring 111 is positioned between the bearing 109 and a collar 113 which normally engages one end face of the block 102; the right hand spring 112 is positioned between the bearing 110 and a collar 114 which engages the other end face of the block 102. Two pins 115 are fixedly mounted in the frame of the structure, and serve to limit the off-normal movement of the collar 113 to the right; and two similar pins 116 serve to limit the off normal movement of the collar 114 to the left. Thus the block 102 is normally maintained by yielding means in the normal position shown in the drawing.

For reciprocating the rod 108 and the block 102 there is provided a piston 120 fitted to a cylinder 121. The action of the piston is controlled pneumatically by a conventional slide valve 122 a source of expansible fluid being shown as at 123. The flow of fluid is restricted as at 124 so that movement of the piston 120 is gradual. The slide valve 122 is controlled by a pair of solenoids 125, 126 mounted on the frame of the structure.

For locking the rod 108 in any position there is provided a clamp member in the form of an arm 130 (see Figures 7 and 8) which is provided with an aperture 131 through which the rod 108 loosely extends when the member 130 is perpendicular thereto. The member 130 is pivoted as at 132 to the frame of the structure, and is pivotally connected at its free end to one end of a link 133 the other end of which is operatively connected to the armature core of an electric solenoid 134. A relatively strong retractile spring 135 is provided for yieldingly maintaining the solenoid armature in normal position. The solenoid 134 is provided with two windings, separately controlled, and the tension of the spring 135 is sufficiently great so that both windings must be energized in order to attract the armature. Once actuated, however, either winding alone is sufficient to retain the armature in the operated position.

Figure 2:
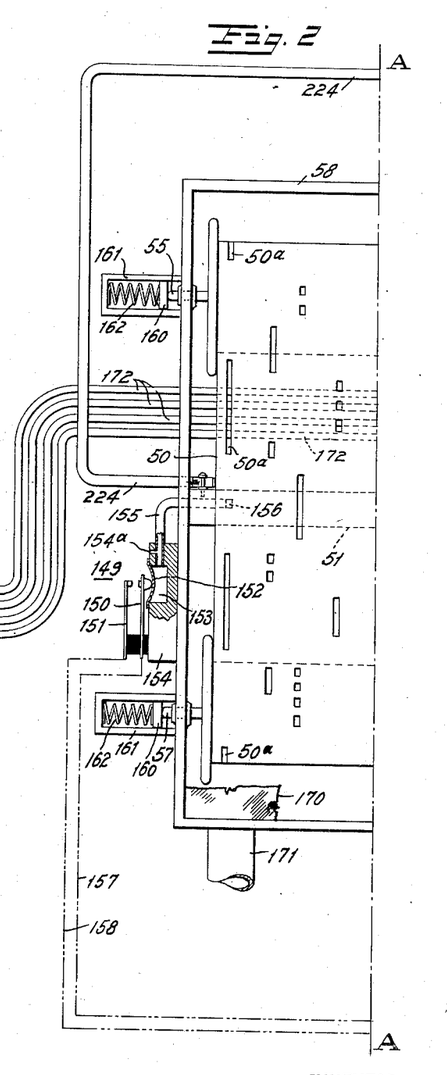
Figure 3:
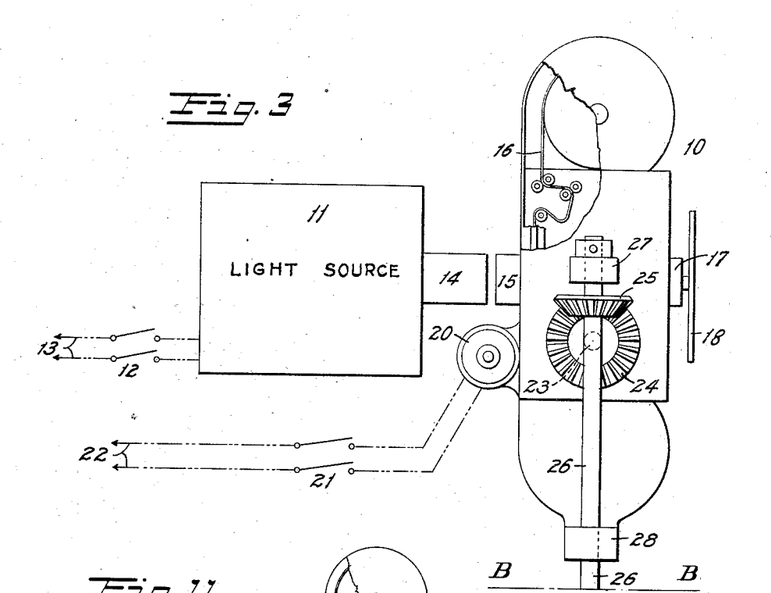
Figure 4:
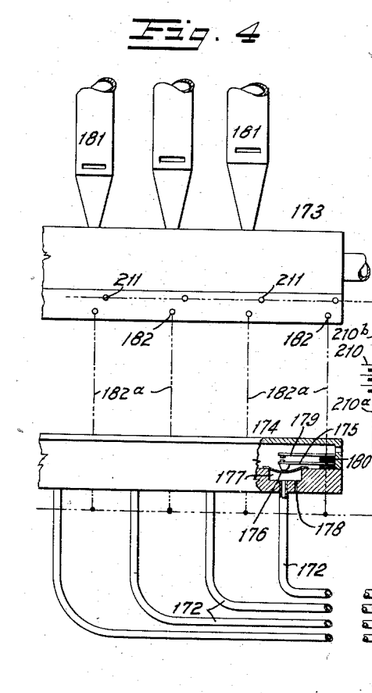
Figure 4 is a diagrammatic representation of a musical instrument controlled by the mechanism shown in Figures 1, 2 and 3.

For controlling the solenoids there is mounted on the shaft 75 a cam 140 (see Figure 9) upon the cam face of which rides an insulating button 141 which is mounted on the free end of a contact spring 142. The contact spring is controlled by the cam to contact with a second contact spring 143 when the button 141 rides on the "high" part of the cam 140. The contact springs 142, 143 are mounted on a block 144 formed of insulating material and affixed to the frame of the structure. The springs form collectively a circuit controlling device. One winding of the solenoid 134 is connected in shunt with the winding of one of the valve control solenoids 126, and the actuating circuit therefor includes a conductor 145, the contact springs 142, 143, a conductor 146, a source of energy such as a battery 147 and common conductor 148. Similarly, the other winding of the solenoid 134 is connected in shunt with the winding of the other valve control solenoid 125 and with the common energy source 147, and for controlling the actuating circuit therefor, there is provided as shown in Figure 2 a pneumatic relay 149. The relay 149 includes a pair of contact springs 150, 151. One end of the contact spring 150 rests upon a pouch 152 of soft leather, forming the covering of a chamber 153 in a block 154. The chamber 153 is connected by a tube 155 to a hole 156 in the tracker bar. A small bleed hole or relief vent 154ª connects the chamber 153 to outside atmosphere to restore the chamber to atmospheric pressure and the springs to noraml after operation. The contact springs 150, 151 are mounted on a strip of insulating material. The arrangement is such that the contact spring 150 engages the mate spring 151 only when the chamber 153 is under pressure and the pouch 152 distended. The spring 150 is connected by a conductor 157 to the energy source 147, the circuit also including one winding of the solenoid 134 and the winding of the solenoid 125 in parallel, a conductor 158 and the other contact spring 151.

The left hand ends of the paper roll shafts 55, 57 are under yielding longitudinal pressure, by devices provided for each of the shafts, a description of one sufficing for both. Each shaft engages a piston 160 which is closely fitted within a cylinder 161. Inside of the cylinder, and pressing against the other face of the piston 160 is a compression spring 162.

The automatic action casing 58 is made substantially air tight and is preferably provided in front with a sliding glass window 170 (see Figure 5) which can be opened to insert new rolls. The interior is under air pressure, the supply being a source such as a feed pipe 171. The flow of air to the holes of the tracker bar 51 is controlled by the note holes in the music sheet 50 which are previously punched according to the musical composition to be played. The tracker bar holes are connected by tubes 172 extending to a source of sound which may comprise an organ 173 shown in Figure 2. Each tube 172 extends to a pneumatic relay 174 which are alike in construction, and a description of one will therefore suffice for all. Each includes a flexible contact spring 175 one end of which rests upon a soft leather pouch 176 forming a wall of a chamber 177, which is in communication with the respective control tube 172. A small bleed hole 178 connects the chamber 177 with outside atmosphere to relieve the pressure and restore the relay to normal after operation. When the pouch is distended, the spring 175 contacts with a mate spring 179, the springs 175, 179 being mounted on a common insulation mounting strip 180. The organ 173 includes a plurality of note pipes such as 181 the air column of each of which communicates with a primary action having a terminal 182. Each terminal 182 is connected by a conductor 182ª to a relay contact spring 179, the contact springs 175 of all relays being "strapped" together and connected together by a common conductor 210ª to one pole of a battery 210 the other pole of which is connected to a common terminal 211 for all of the primary mechanisms.

Figure 5:
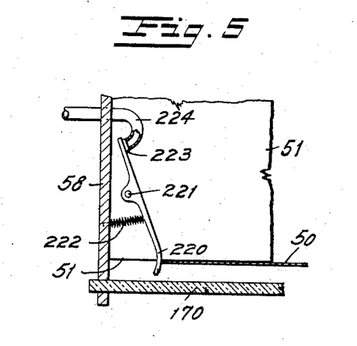
Figures 5 and 6 are detailed top plan views of portions of the roll sheet alignment device of Figures 2 and 3.

For keeping the paper strip 50 in proper alignment with the holes of the tracker bar 51, as shown in Figure 5, there is provided a member 220 pivoted as at 221 and having a curved end in frictional engagement with the edge of the note sheet 50. A light compressional spring 222 keeps the member in continual contact with the sheet. The other end of the member 220 is padded with a strip 223 of felt or the like, forming a closure for the end of a tube 224, (Fig. 1). The tube 224 extends to a bellows 225 mounted on the frame and having its movable element operatively connected by a link 226 to an arm 227 which is secured to a vertical shaft 228. The shaft 228 is rotatably mounted in suitable bearings in the frame of the structure, and has two collars 229 keyed thereto for holding it in fixed longitudinal position. The outer end of the arm 227 is in abutting engagement with the rounded end of the shaft 54. A second arm 230 is affixed to the shaft 228 opposite the shaft 56 and similarly, is in abutting engagement with the rounded end thereof.

In the operation of the form of the invention shown in Figures 1 to 9 and hereinbefore described, the moving picture projector 10 is operated in the usual manner with the switches 12 and 21 closed. The source of light 11 projects a strong beam through the lenses 14, the film 16 and through the focusing lens 17 and is intermittently controlled by the shutter 18 at a sufficiently rapid rate to produce a substantially constant image on the screen; the motor 20 moves the film 16 intermittently so that the effect of motion may be produced on the screen in accordance with the action represented in the film. At the same time the shaft 23 is rotated at a uniform speed, and the motion thereof is communicated to the shaft 26. With the clutch 30 engaged, the shaft 33 is also driven and by means of the differential 69 the motion is communicated to the shaft 75 at substantially the same speed but in a reverse direction. The shaft 75 drives the disc 77 which in turn drives the roller 95 and causes the rotation of the wind-up spool 53. As this spool is rotated it causes the note sheet 50 to be wound upon it and to be unwound from the spool 52. The brake 62 acting upon the roller 60 retards the motion of the spool 52 to a sufficient extent to hold the paper always taut between the two rolls. The paper moves across the tracker bar 51 and the note perforations in the paper are thus brought into register with the holes in the tracker bar thus allowing the air which is under pressure within the casing 58 to pass through the corresponding tubes 172 in accordance with the music which is to be played. The air pressure is communicated through each of the tubes 172 to the respective pneumatic relay chamber 177 thus inflating the pouch 176 and causing the contact 175 to engage the contact 179. This closes a circuit from the battery 210 through the conductor 210$^a$, contacts 175 and 179, conductor 182$^a$ to the corresponding terminal 182 for actuating the respective primary action and causing the stop action controlling the respective pipe to be operated. The pipe is sounded and produces a note of the musical scale. By thus controlling the tubes 172 the notes may be sounded in desired combination so as to produce a desired musical composition. Means are provided for definitely maintaining the holes of the note sheet in register with the tracker bar holes, such means being brought into operation if for any reason the paper should deviate from its proper position. For example, should the paper 50 be moved to the right, the member 220 rotates in a counter clockwise direction about its pivot 221 under control of the spring 222, and thus the opening to the tube 224 is uncovered. Since the interior of the casing 58 is under pressure, air will enter the tube 224 and will pass to the interior of the bellows 225 to cause inflation of the bellows. The movable member of the bellows moves towards the left of Figure 1 and moves the link 226 to the left thus rotating the arm 227 (see Figure 6) in a clockwise direction. The shaft 228 and the lower arm 230 are also rotated in a clockwise direction. This motion is communicated to the shafts 54 and 56 causing them to be moved to the left against the action of the springs 162 in the cylinders 161. This will cause the two spools together with the paper 50 to be moved bodily to the left until the paper has been moved sufficiently to rotate the member 220 to close the tube 224 thus shutting off the supply of air to the bellows 225. The springs 162 will then reverse the action and will tend to deflate the bellows 225; the air in this bellows escaping through the bleed hole 231. The paper will now be moved towards the right and the action will be repeated. Thus a proper balance is found between the compression of the springs 162 and the average position of the bellows 225 so that the paper is continuously maintained in register with the tracker bar holes.

As the shaft 75 rotates it will cause the worm 107 to rotate at the same speed and also rotate the worm wheel 105 at a greatly reduced speed. The gear 105 turns in a clockwise direction as seen in Figure 1 and thus the lower end of the arm 100 will be moved towards the left so as to oscillate the arm 100 in a clockwise direction about its pivot 101. The upper end of the arm 100 and the link 98 with its roller 95 will be moved gradually to the right, and thus the speed of rotation of the shaft 56 will be gradually decreased. The cutting of the spiral groove 104 in the gear wheel is such that the reduction in speed of the shaft 56 is just sufficient to compensate for the increase in diameter of the paper wound up on the roll 53 and thus to maintain a uniform linear speed of movement of the note sheet 50 with respect to the tracker bar 51.

Under ideal conditions the film 16 and the paper strip 50 should move at such rates of speed that the music synchronizes with the action of the picture but on account of stretching or contraction of the paper 50 by atmospheric or other causes this relation might not be maintained. The relation must therefore be adjusted by the action of the synchronizing mechanism which will now be described. The synchronization mechanism is so constructed and arranged that one revolution of the shaft 75 should normally correspond to movement of the paper 50 from the beginning of one of the longitudinal perforations 50ª in the paper which are in register with the tracker bar hole extending to the tube 156 to the next succeeding perforation. The cam 140 is so arranged that normally it closes the contact springs 142 and 143 at the same time that one of these perforations 50ª uncovers the hole 156 in the tracker bar 51. When the hole 156 is exposed, air under presure will pass through the tube 155 and enter the chamber 153 thus inflating the pouch 152 and causing the contact spring 150 to engage the contact spring 151. When the paper has moved so that the hole 156 is closed, air under pressure is cut off from connection with the chamber 153 and the pressure therein is released through the small bleed hole 154ª. If the contact springs 142 and 143 close at exactly the same time that the contacts 150 and 151 are closed the solenoids 125 and 126 and 134 are energized simultaneously. As both solenoids 125 and 126 are energized at the same time and as they attempt to actuate the same valve slide element in opposite directions, the valve 122 will not be moved but will remain in the position shown in Figure 1. Inasmuch as both windings of the solenoid 134 are energized the armature thereof will be moved to the left thus causing the locking member 130 to seize the shaft 108 and effectually prevent movement of the shaft.

If, however, the paper for any reason moves across the tracker bar a little faster than it should the hole 156 will be uncovered a little before the cam 140 has caused the contact 142 to engage the contact 143. In this case the solenoid 125 will be energized before the solenoid 126, thus pulling the valve 122 towards the left of Figure 1, against the action of the spring 125ª. At the same time one winding of the solenoid 134 will be energized, but as this is not sufficient to move the armature, no other effect is produced thereby upon the operation of the apparatus. Movement of the valve 122 towards the left permits air under pressure to pass from the source 123 to the left hand side of the cylinder 121 thus causing the piston 120 and the rod 108 to be moved slowly towards the right. The rod 108 carries the block 102 which is therefore also moved towards the right and the arm 100 is thus oscillated with respect to the point of contact between the roller 103 and the wheel 105 in a clockwise direction. This causes a movement of the upper end of the arm 100, the link 98 and the driving roller 95 towards the right, which decreases the speed of rotation of the shaft 56 and slows down the movement of the paper 50. This deacceleration continues until cam 140 causes the contact spring 142 to engage the contact spring 143 thus energizing the solenoid 126 and the hitherto inert winding of the solenoid 134. At both windings of the solenoid 134 are now energized the locking member 130 is caused thereby to seize the rod 108 and to maintain it in whatever position it may have assumed. The roller 95 will thus be held in the corresponding position, thus tending to continue to slow down the movement of the paper 50. When the hole 156 is again covered the pneumatic relay 149 is released and the contact between the contact spring 150 and the contact spring 151 is opened. The solenoid 125 is thus deenergized, and as the contact springs 142 and 143 are still engaged, and thus the solenoid 126 is still energized, the slide valve 122 is moved towards the right allowing air to enter the right hand side of the cylinder 121 and opening the left hand end of the cylinder to atmosphere. The piston 120 and the rod 108 are prevented, however, from being moved towards the left because the solenoid 134 is still energized by one of the windings and the locking device 130 is thereby held in the locking position. When the cam 140 has been turned sufficiently to open the circuit, the solenoid 126 will be deenergized and the solenoid 134 will be wholly deenergized. This releases the rod 108 which may return to normal by the action of the spring 112 acting on the collar 114 until the collar engages the pins 116. Thus the roller 95 is returned to a position which corresponds to the position it would have then been in under normal conditions of operation.

In case the linear speed of the paper is less than it should be for any reason the cam 140 will close the circuit of the solenoid 126 while the pneumatic relay 149 is inactive so that one of the windings of the solenoid 134 and the winding of the solenoid 126 will be energized. The slide valve 122 is thus moved to the right allowing air under pressure to enter the right hand side of the cylinder 121. This will cause the rod 108 and the block 102 to be moved to the left thereby moving the upper end of the arm 100 and the roller 95 to the left so as to increase the speed of movement of the paper. The gradual motion of the roller 95 to the left continues until the pneumatic relay 149 operates to close the circuit of the other windings of the solenoid 134 whereupon the member 130 is rocked to seize the rod 108 and maintain it in fixed position. The increased speed is maintained until the circuits of both of the windings of the solenoids 134 as well as of the windings of the solenoids 125 and 126 are deenergized whereupon the block 102 and the rod 108 are restored to normal by the spring 111.

In either case it will be seen that the extent of movement of the roller 95, i. e., the extent of acceleration or of de-acceleration of the note sheet is proportional to the distance that the paper is ahead of or behind its normal position, and that the accelerated or de-accelerated speed is maintained until the cam 140 and the pneumatic relay 149 break their respective circuits. It will also be seen that the synchronizing takes place intermittently and in the embodiment shown, once for each revolution of the shaft 75.

In case for any reason such as because a film may have been broken and patched, or for other reasons, it is desired to modify the relative position of the paper note sheet 50 with respect to the film 16, the handle 74 may be turned so as to rotate the casing of the differential 69. This causes a relative displacement between the shafts 33 and 75 so that the modified relation, in position between the paper 50 and the film 16 may thereafter be maintained in accordance with the will of the operator.

After a film has been exposed it may be taken out of the projector and rewound on an ordinary film rewinding mechanism. It may also be found desirable to rewind the paper note sheet on a separate rewinding mechanism but the automatic player action is also arranged for rewinding the note sheet. Should it be desired to rewind the note sheet the rod 86 is moved to the left thus causing a rotation of the lever 83 in a counter clockwise direction and of the lever 66 in a clockwise direction. The movement of the lever 83 lifts the disc 77 from frictional contact with the roller 95 thus freeing the lower spool 53 from the driving mechanism. An arm of the lever 83 also causes application of the brake 92 to the wheel 93, to hold the note sheet taut during the winding operation. The movement of the lever 66 in a clockwise direction causes the roller 60 to make frictional engagement with the driving disc 41 which is rotating in a direction opposite to the direction of the disc 77, and causes this reverse movement to be communicated to the roller 60 and at a relatively high speed, as will be noted from the relative diameters of the disc 41 and the roller 60. The spool 52 is thereby driven at a high speed in a direction to rewind the note sheet. The knob 90 may then be pulled outwardly again so as to discontinue the rewinding operation.

In the modified form of the invention shown in Figures 10 and 11, the same type of moving picture projector is used as was described in connection with the first form of the invention, and similar parts are denoted with the same numerals. In this form, however, the bevel gear 24 is replaced by the cam 140 which has been removed from the shaft 75. The contacts 142 and 143 are located adjacent to this cam, and are fastened to the insulating block 144 which is supported by the casing of the moving picture machine 10. In this form, the clutch member 32 has been replaced by a worm gear 300, which is rigidly secured to the end of the shaft 33. Meshing with the gear 300 is a worm 301 which is mounted on the shaft 302 of a motor 303 which is mounted on the top of the casing 58. The field windings of this motor are connected to terminals 304 and 305 and armature brushes are connected to terminals 306 and 307. In this form of the invention, the roller 95 is rigidly secured to the shaft 56 which is provided with a bearing in a bracket 310. The worm 107 meshes with a worm gear 311. This worm gear is provided with hubs 312 which are rotatably mounted in brackets 313 and 314. Threaded through the hub 312 is a rod 315 the other end of which slides through a bearing 316. This end of the rod 315 is square shaped and is not rotatable with respect to the bearing 316. This bearing is carried on a bracket 317, and is insulated therefrom by a strip of insulation 318. Mounted on the rod 315 is a contact arm 320, which slides over a resistance 321 mounted on a strip of insulation 322 which is supported by the brackets 314 and 317.

In this form of the invention, the cylinder 121 with its associated parts, is mounted as a separate unit. The parts of this unit are identical with those described in connection with Figure 1 and similar parts are designated with the same numerals as in that figure. Secured to the block 102 is a contact arm 324 which slides over a resistance 325, mounted on a strip of insulating material 326, which is mounted on the frame of the apparatus. The wiring of the solenoids 125, 126 and 134 is the same as that described in connection with Figure 1 and is similarly numbered.

The terminals 304 and 305 are connected by two conductors 330 and 331 to opposite sides of a battery 332. The terminals 306 and 307 are connected by two conductors 333 and 334 through a reversing switch 335 to one side of the battery 332 and to a conductor 336 the other end of which is connected to the bearing 316. One end of the resistance 321 is connected by a conductor 337 to one end of the resistance 325. The bearing 110 is connected by a conductor 338 to one end of a variable resistance 339, the contact point of which is connected by a conductor 340 to the battery 332.

The mechanism between the shaft 33 and disc 77 and the player mechanism in the casing 58 are identical with the mechanism shown in Figures 1 and 2 and the same parts are designated by the same numerals. The tubes 172 are connected to the corresponding tubes in Figure 4 and control the playing of the organ 173.

Figures 6, 7, 8, 9, 11:
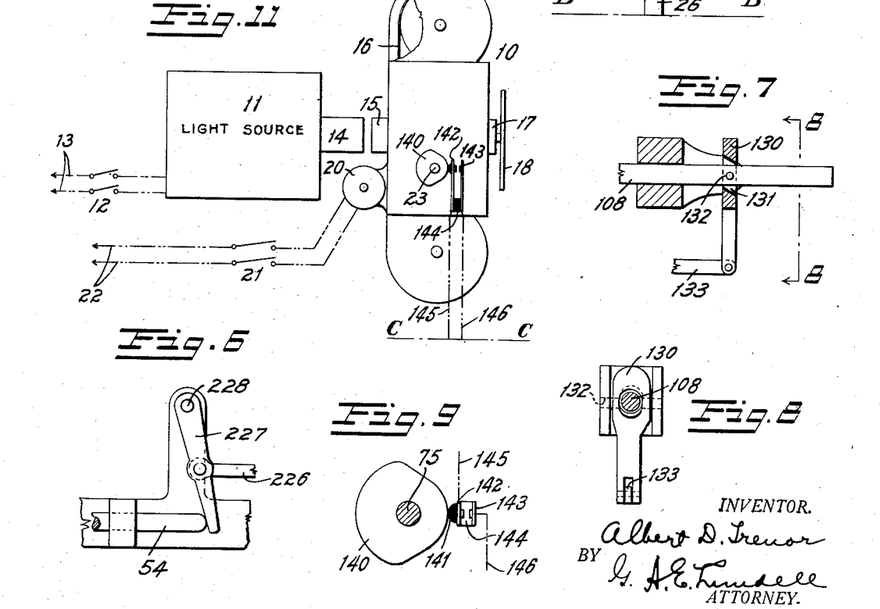
Figures 7 and 8 are enlarged side and end sectional elevations respectively of the electric magnetic control mechanism of Figure 1.
Figure 9 is a bottom plan view taken on line 9—9 of Figure 1.
Figures 10 and 11 joined together on line C—C constitute a fragmentary elevation of a modified form of the invention.
Figure 10:
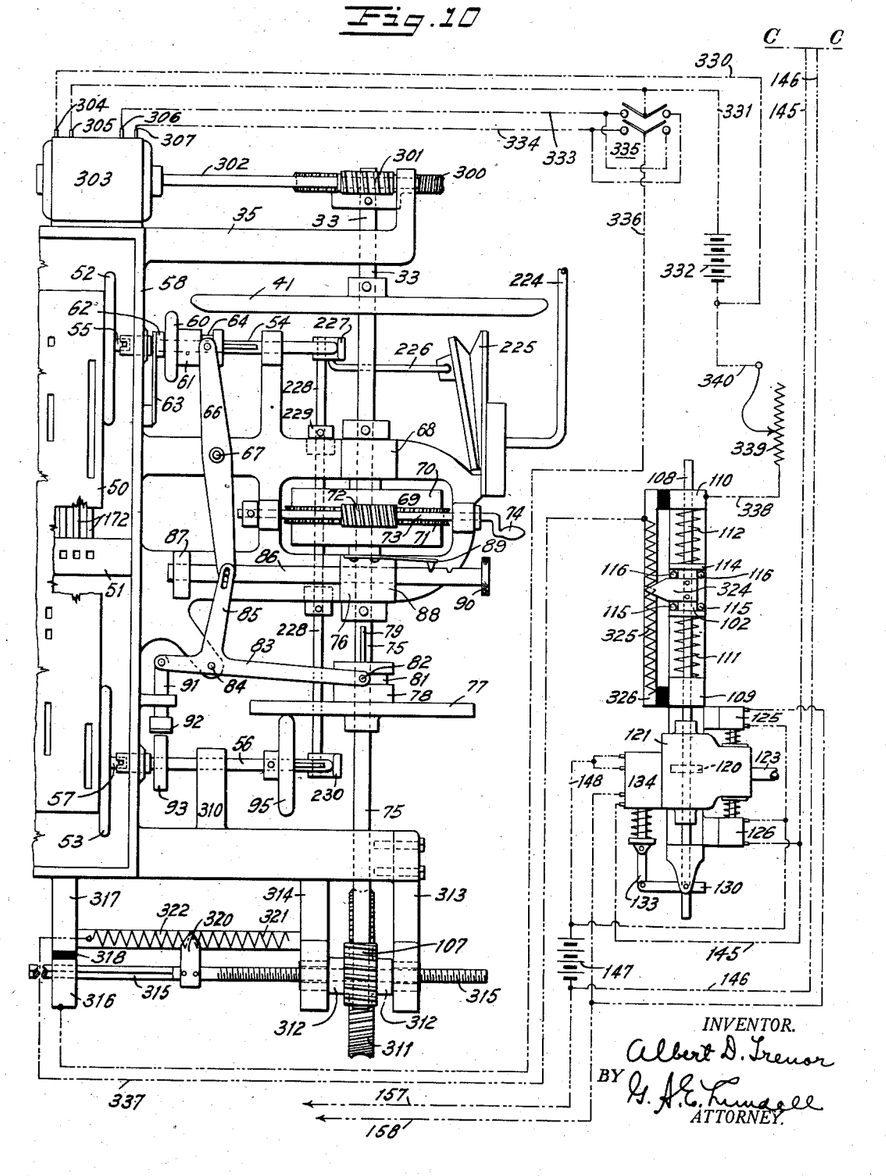

In the operation of the modified form of the invention shown in Figures 10 and 11, the moving picture projector 10 is operated in a manner similar to that previously described. As the shaft 23 rotates, the cam 140 will cause the contacts 142 and 143 to engage for one-half of a revolution during each revolution of the shaft 23. When the mechanism is started, the contact 320 is moved as far to the left as possible by running the motor 303 in such a direction that the threaded rod 315 is caused to move to the left. The switch 335 is now opened, thus stopping the motor 303. The variable resistance 339 is now set at a pre-determined position so that under normal conditions, the paper strip 50 will run in synchronism with the film 16. The paper strip 50 is now attached to the lower spool 53 and the switch 335 is closed in the opposite direction, thus causing the motor 303 to rotate in the opposite direction to that which moved the contact 320 to the left. At the same time, the switches 12 and 21 are closed, thus starting the motion picture projector. As the shaft 33 and therefore the shaft 75 rotate, the worm 107 will cause the gear 311 to rotate in such a direction that the threaded rod 315 will be moved to the right thus gradually moving the contact 320 to the right across the resistance 321. This gradually increases the resistance in the armature of the motor 303, thereby gradually slowing down its supply of motion sufficient to compensate for the winding up of the paper 50 on the roll 53. In this way, the linear speed of the paper 50 is kept at a constant rate during the playing of the piece.

If the paper strip 50 is running in synchronism with the film 16, the holes 50ᵃ in the paper strip 50 will come opposite the opening 156 at the same time that the contacts 142 and 143 on the projector 10 are closed, thus energizing the the two solenoids 125 and 126 simultaneously. This as previously described does not change the position of the block 102, and therefore does not change the resistance 325 which is in the circuit of the armature of the motor 303. If, however, the paper strip 50 should run a little faster in proportion to the speed of the film 16, the holes in the paper strip will uncover the hole 156 before the cam 140 causes the two contacts 142 and 143 to engage. This, as previously described, will close the circuit through the contacts 150 and 151, thus energizing the solenoid 125 which will then cause the rod 103 to move downward as seen in Figure 10, thus moving the contact 324 along the resistance 325 thereby increasing the resistance of the armature of the motor 303. This will cause this motor to slow down, which in turn will slow down the rotation of the spool 53, thus slowing down the speed of the paper 50 until it is again in synchronism with the film 16.

If, however, the paper strip 50 should be running slower than it should, the contacts 142 and 143 will be closed before the hole in the paper 50 uncovers the hole 156. In this case, the solenoid 126 will be energized, thereby moving the contact 324 upward, and decreasing the resistance of the armature circuit of the motor 303, thus speeding up the paper 50. The operations of the solenoid 134 and associated parts and the tracking mechanism, differential, rewinding mechanisms and organ 173 are the same as those described in connection with Figures 1, 2 and 3. In this form of the invention, it is seen that the projector mechanism and the player mechanism are set independently to run at the same speed, but that the speed of the latter is controlled so that it can be speeded up or slowed down an amount sufficient to keep it in synchronism with the projector mechanism. In this way, the two mechanisms may be placed at any desired distance apart, the only connection necessary being the two wires 145 and 146.

The invention upon which this application is based is broader than the specific embodiment shown and described for the purpose of illustrating at least one of the ways in which it may be employed. The scope of the invention is therefore to be understood as not being limited by the present specific description. I intend no limitations other than those imposed by the claims.

What is claimed is:

1. In a system of synchronization, the combination with an automatic player mechanism and a perforated note sheet for controlling said mechanism, of a utility, means controlled by said projector for driving said note sheet, and compensating means for automatically modifying the action of said driving means proportionally to the extent of deviation from the predetermined relative positions of the note sheet and the utility.

2. In a system of synchronization the combination with an automatic player mechanism and a perforated note sheet for controlling said mechanism, of a utility, means controlled by said utility for driving said note sheet, compensating means for modifying the action of said driving means proportionally to the extent of deviation in relative position of the note sheet and the utility, said compensating means including a variable speed transmission, an arm for controlling said transmission, a support for said arm, a rod for moving said support, and an actuating device for moving said rod controlled by the conjoint action of the utility and the note sheet.

3. In a system of synchronization, the combination with an automatic player mechanism, a perforated note sheet for controlling said mechanism, and means intermittently actuated by said note sheet, of a utility, means intermittently actuated by movement of said utility, means for modifying the action of said player mechanism rendered effective upon the actuation of either one of said intermittently actuated means, and a locking device for said modifying means effective upon the actuation of both of said intermittently actuated means, said locking device being maintained in operated position by the actuation of either one of said intermittently actuated means.

4. In a system of synchronization, the combination with one movable mechanism, and a device intermittently actuated by the movement of said movable mechanism, of a second movable mechanism, a device intermittently actuated by the movement of the second named movable mechanism, a speed changing element to modify the action of one of said movable mechanisms relative to the other rendered effective by the actuation of either of said intermittently actuated devices, and a lock for holding said element in desired position rendered operatve upon the actuation of both of said devices, and held operated by the actuation of either.

5. In a system of synchronization, the combination with one movable mechanism, and a pair of contacts intermittently actuated by the movement of said movable mechanism, of a second movable mechanism, a second pair of contacts intermittently actuated by the movement of the second named movable mechanism, a variable speed transmission operatively interconnecting said mechanisms and arranged to modify the action of one of said movable mechanisms relative to the other upon actuation of either of said contacts, and a lock for holding said transmission in desired position rendered operative upon the actuation of both of said contacts, and held operated by the actuation of either.

6. In combination with a utility, a musical instrument and automatic means for playing said instrument comprising an actuating member, means controlled by said utility for operating said actuating member, means actuated by the differential relationship of said actuated member and said utility for varying the speed of said member, means actuated by the conjoint action of said utility and said member for holding the speed of said member constant, and means whereby said speed will remain constant over a predetermined period of time.

7. In combination with a mechanically operated musical instrument, a tape for operating said instrument, a shaft for driving said tape and means for synchronizing said tape with said shaft comprising means operable in response to differential movement of said tape and said shaft for varying the respective speeds, and means for holding constant the ratio of said speeds over a predetermined interval of time corresponding to a half revolution of said shaft.

8. In combination with a reproducing musical instrument, an actuating tape therefor, a shaft for driving said tape, means for varying the ratio of power transmission from said shaft to said tape for maintaining the speed of said tape constant, controllers normally operated by said tape and by said shaft over predetermined time intervals and means whereby differential operation of said controllers changes the speed ratio between said shaft and said tape, means whereby simultaneous operation of said controllers holds said speed ratio constant, and means responsive to the release of both of said controllers for returning said speed ratio to its initial value.

9. In a system of synchronization, the combination with an automatic player mechanism and a perforated note sheet for controlling said mechanism, of a utility, means controlled by said utility for driving said note sheet, compensating means for modifying the action of said driving means proportionally to the extent of deviation in relative position of the note sheet and the utility, said compensating means including a variable speed transmission, an arm for controlling said transmission, a support for said arm, a rod for moving said support, and an actuating device for moving said rod comprising a pneumatic cylinder, a piston carried by said rod and normally centrally located in said cylinder, controllers synchronized with said sheet and with said utility respectively, means whereby differential time operation of said controllers causes movement of said piston from its normal position, means whereby simultaneous operation of said controllers holds said piston stationary, and means whereby release of both of said controllers returns said piston to its neutral position.

10. In a system of synchronization, the combination with an automatic player mechanism and a perforated note sheet for controlling said mechanism, of a utility, means controlled by said utility for driving said note sheet, compensating means for modifying the action of said driving means proportionally to the extent of deviation in relative position of the note sheet and the utility, said compensating means including a variable speed transmission, an arm for controlling said transmission, a support for said arm, a rod for moving said support, an actuating device for moving said rod, controllers synchronized with said perforated sheet and with said utility respectively, said controllers normally operating simultaneously, means whereby prior operation of one controller will cause movement of said rod in a given direction, means whereby operation of both controllers holds said rod in its new position, and means whereby release of both controllers restores said rod to its normal position.

11. In a system of synchronization, the combination with an automatic player mechanism and a perforated note sheet for controlling said mechanism, of a utility, means controlled by said utility for driving said note sheet, compensating means for modifying the action of said driving means proportionally to the extent of deviation in relative position of the note sheet and the utility, said compensating means including a variable speed transmission, an arm for controlling said transmission, a support for said arm, a rod for moving said support, an actuating device for moving said rod, pneumatic means for moving said rod, means for controlling said pneumatic means in response to the differential position of said sheet and said utility, means for maintaining said rod in its moved position for a predetermined period of time, and means for subsequently restoring said rod to its normal position.

12. Mechanism for synchronizing a music roll with a driving shaft comprising contacts synchronously operated with said roll and with said shaft respectively, means whereby prior operation of one of said contacts varies the speed of said roll, means whereby simultaneous operation of said contact holds said speed constant, and means whereby release of both of said contacts restores said speed to normal.

13. A device for synchronizing a music roll with an operating shaft, which comprises contacts synchronized respectively with said roll and said shaft, means operable in response to closing of one of said contacts only for varying the speed of said roll, and locking means operable in response to closing of both of said contacts for holding said speed to its selected value.

14. A device for synchronizing a music roll with an operating shaft, which comprises contacts synchronized respectively with said roll and said shaft, means operable in response to closing of one of said contacts only for varying the speed of said roll, locking means operable in response to closing of both of said contacts for holding said speed to its selected value, and means for continuing the operation of said locking means while either contact is closed.

15. In a system of synchronization, the combination with an automatic player mechanism and a perforated note sheet for controlling said mechanism, of a utility, means controlled by said utility for driving said note sheet, compensating means for modifying the action of said driving means proportionally to the extent of deviation in relative position of the note sheet and the utility, said compensating means including a variable speed transmission, an arm for controlling said transmission, a support for said arm, a rod for moving said support, resilient means for normally holding said rod in neutral position, pneumatic means for moving said rod, and means operated by either said sheet or said utility for actuating said pneumatic means, means operated by conjoint action of said sheet and said utility for de-energizing said pneumatic means and a lock for holding said rod stationary over a predetermined period of time.

16. In a system of synchronization, the combination with an automatic player mechanism and a perforated note sheet for controlling said mechanism, of a utility, means controlled by said utility for driving said note sheet, compensating means for modifying the action of said driving means proportionally to the extent of deviation in relative position of the note sheet and the utility, said compensating means including a variable speed transmission, an arm for controlling said transmission, a support for said arm, a rod for moving said support, controllers intermittently operated by said sheet and by said utility, means whereby said controllers normally operate simultaneously, means for moving said rod by an amount proportional to the differential operation of said controllers, and locking means for holding said rod stationary in its new position over a predetermined period of time.

17. In a system of synchronization, the combination with an automatic player mechanism and a perforated note sheet for controlling said mechanism, of a utility, means controlled by said utility for driving said note sheet, compensating means for modifying the action of said driving means proportionally to the extent of deviation in relative position of the note sheet and the utility, said compensating means including a variable speed transmission, an arm for controlling said transmission, a support for said arm, a rod for moving said support, controllers intermittently operated by said sheet and by said utility respectively, pneumatic means for moving said rod and means whereby simultaneous operation of said controllers holds said rod stationary, and means whereby differential actuation of said controllers causes a movement of said rod proportional to the time differential of said operation.

Signed at New York, in the county of New York and State of New York, this 20th day of October A. D., 1926.

ALBERT D. TRENOR.